United States Patent

Salemink

[15] 3,690,039
[45] Sept. 12, 1972

[54] PORTABLE APPARATUS FOR REMOVING PARTICULATE MATERIAL FROM EXHAUST GASES

[72] Inventor: Willard L. Salemink, 209 W. 6th St., West Liberty, Iowa 52776

[22] Filed: Aug. 17, 1970

[21] Appl. No.: 64,388

[52] U.S. Cl. .................55/228, 55/256, 55/260, 55/421
[51] Int. Cl. ...........................B01d 47/00
[58] Field of Search........55/223, 228, 256, 260, 356, 55/421

[56] References Cited

UNITED STATES PATENTS 1,609,611  12/1926  Dovel ...................55/260 X
2,745,646  5/1956  Stoltz ....................55/256 X
3,409,275  11/1968  Miller et al. ...........55/228 X Primary Examiner—Robert L. Lindsay, Jr.
Attorney—Henderson & Strom

[57] ABSTRACT

An apparatus to remove particulate material from exhausted gases comprising a washing chamber connected to a settling pond to form an integral portable unit. The apparatus includes an elongated settling pond and a U-shaped gas washing chamber connected thereto, the chamber adapted to receive the particle-laden gases and subject the gases to a water spray which separates the material from the gases into a particle-water slurry which is pumped into the pond where the particles settle out and are removed therefrom by a scraper unit disposed therein, while the purified gases escape to the atmosphere.

3 Claims, 5 Drawing Figures

INVENTOR.
WILLARD L. SALEMINK

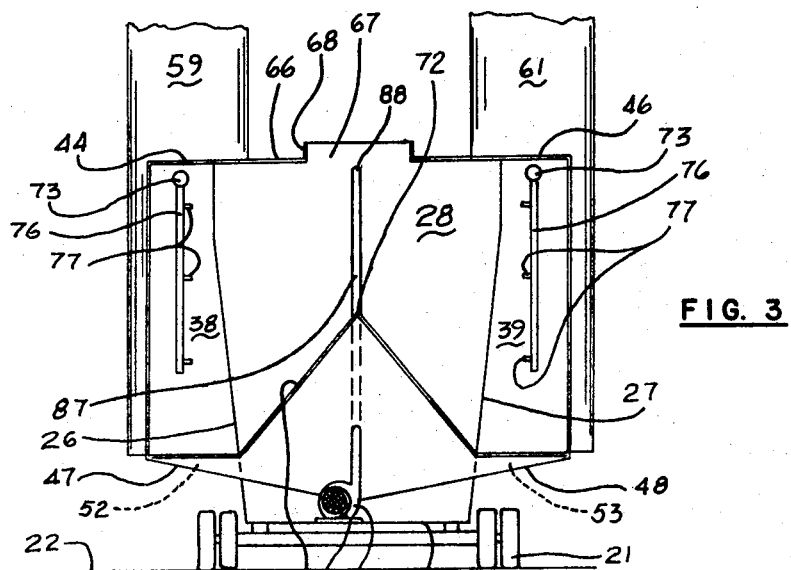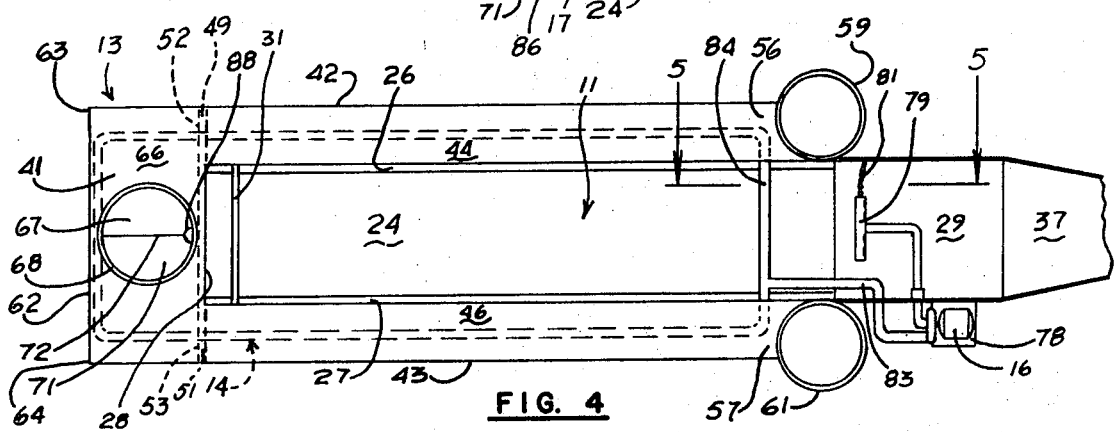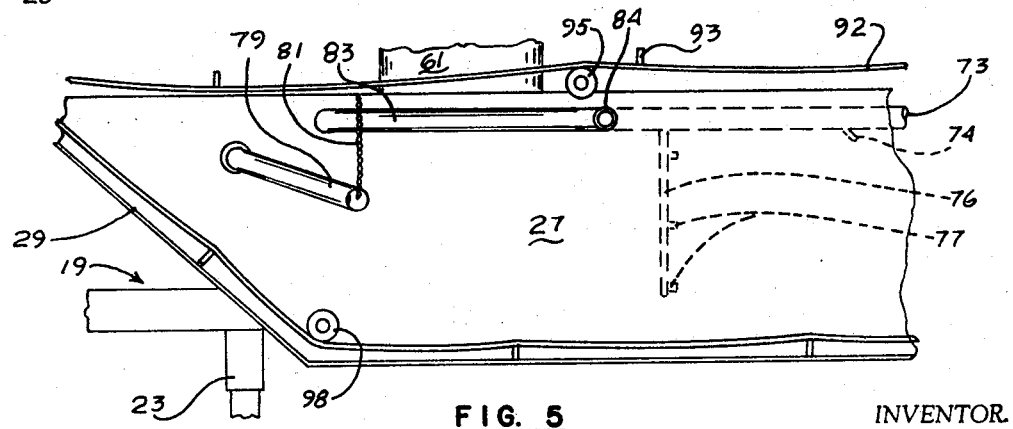

PORTABLE APPARATUS FOR REMOVING PARTICULATE MATERIAL FROM EXHAUST GASES

BACKGROUND OF THE INVENTION

This invention relates generally to apparatuses for removing airborne materials from exhaust gases and more particularly to portable apparatuses comprising a washing chamber and settling tank arrangement for removing particulate material from asphalt plant discharges.

Many industries are confronted with the problem of removing particulate material from smoke or gaseous discharges prior to finally exhausting the discharge to the atmosphere. This invention is designed to overcome this problem and is primarily directed toward the asphalt industry which has the problem compounded owing to the mobility of its plants.

An asphalt plant in operation will discharge up to 85,000 CFM of hot gases containing a large quantity of particulate material below 200 mesh size. The most efficient way to remove the particulates is by means of a wet washer or scrubber. With the mobile asphalt plants comes the problem of an adequate water supply to wash the discharge. Therefore, the preferred apparatus should contain means to conserve and recirculate the water supply. Likewise, a settling tank should be provided not only to recover the water to be recirculated, but to collect the particulate material in a bulk form and thereby facilitate either disposal or reuse thereof.

Wet washers and settling tanks are known in the prior art, however, the washers and tanks are generally independent and are not portable. One U.S. Patent does teach a portable combination wherein the washer and the tank are independently portable and are assembled in combination at the plant site. The two units are assembled for operation by suspending the washer unit above the settling tank upon a plurality of upright supports straddling the tank. A dissadvantage inherent with this type of assembly is that a pair of costly truck tractors and drivers are necessary to transport the two units, and a crane, or the like, is necessary to assemble or dismantle the washer at the plant site.

The present invention is adapted to alleviate the hereinbefore described problems by providing an integral portable unit capable of recirculating substantially clean water to the washer while collecting the settled particulate material for efficient and non-polluting disposal.

SUMMARY OF THE INVENTION

A portable apparatus for removing particulate material from a gaseous discharge, the apparatus including a frame; an elongated settling tank mounted to the frame; a U-shaped washing chamber connected to the tank and adapted to receive the discharge, the chamber having an elongated duct disposed laterally of each side of the tank, each duct having an outlet formed therein for exhausting the treated discharge to the atmosphere; a water spray unit disposed within the chamber for treating the particle-laden discharge to separate the particulate material therefrom; a first pump fluidly connected to the tank and the spray unit for supplying water to the spray unit; a second pump for removing the particulate-water slurry from the washing chamber to the settling tank; and a scraper unit to remove the settled material from the tank.

It is an object of this invention to provide an improved portable wet washer and settling tank combination.

It is another object of this invention to provide a self-contained wet washer and settling tank combination that is capable of being transported in a single, portable unit.

It is yet another object of this invention to provide a portable pollution control apparatus capable of removing particulate material from gaseous discharges that requires relatively little set-up time for full operation.

It is still another object of this invention to provide a wet washer and settling tank combination that is easily connected to a plant emitting particle-laden discharges and which removes the particles therefrom with the aid of a water spray and is capable of conserving the water for reuse.

Another object of this invention is to provide a baffle means to substantially inhibit disturbing the water and particulate matter in a settling pond, whereby settling of the particulate matter is enhanced.

Yet another object of this invention is to provide a portable air pollution control device for removing particulate material from gaseous discharges that is simple to operate, economical to operate and is rugged in construction.

These objects and other features and advantages will become readily apparent upon reference to the following description when taken in conjunction with the accompanying drawings.

BRIEF DESCRIPTION OF THE DRAWINGS

FIG. 3 is an enlarged cross-sectional view as taken along the line 3—3 of FIG. 2;

FIG. 4 is a plan view; and

FIG. 5 is a fragmentary cross-sectional view as taken along the line 5—5 of FIG. 4.

DESCRIPTION OF THE PREFERRED EMBODIMENT

Figure 1:
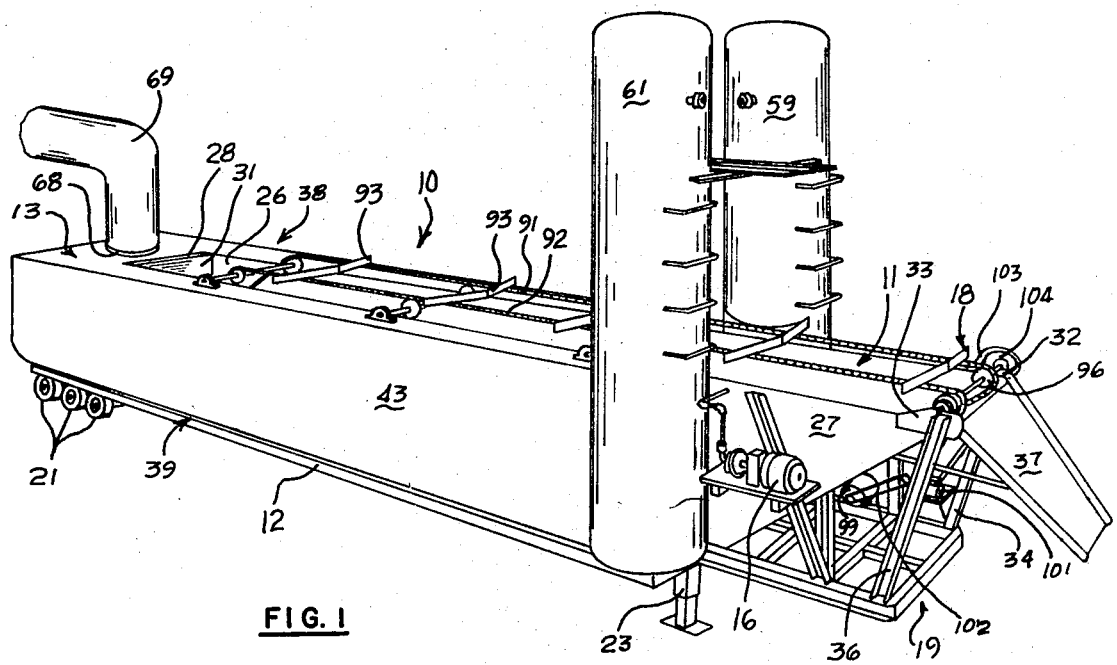
FIG. 1 is a perspective view of the portable pollution control apparatus of this invention.

Referring now to FIG. 1 of the drawings, the portable pollution control apparatus of this invention is indicated generally by the numeral 10. The apparatus 10 generally resembles a semi-trailer and is adapted to be connected to a conventional truck tractor (not shown) for transporting purposes.

Figure 2:
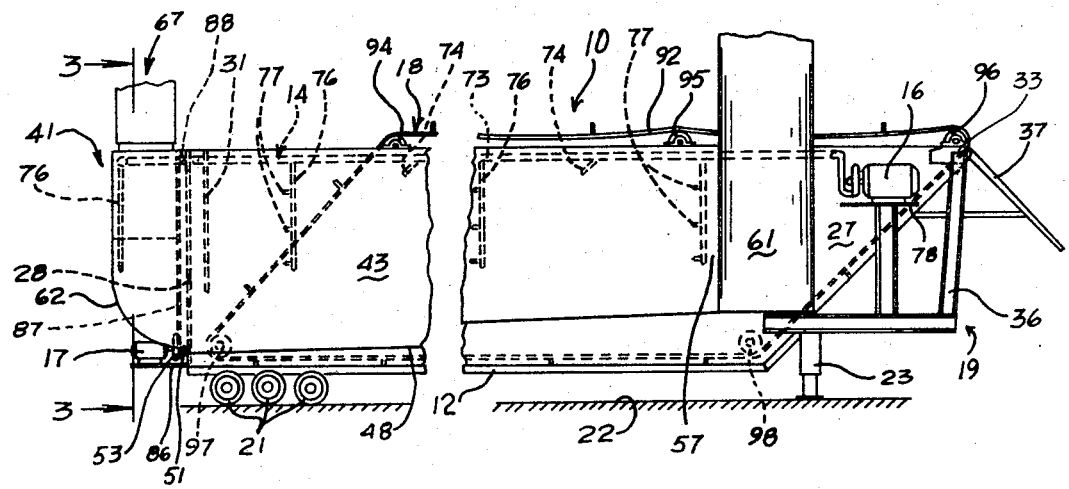
FIG. 2 is a side elevational view of the apparatus, with certain parts shown in broken lines for clarity of illustration.

The apparatus 10 (FIGS. 1 and 2) generally includes an elongated settling tank 11 mounted on a frame 12, a U-shaped washing chamber 13 connected to the tank 11, a spray unit 14 mounted within the chamber 13 for washing particulate material from a gaseous discharge, a pressure pump 16 fluidly connected to the spray unit 14 for pumping pressurized water thereto, a sludge pump 17 fluidly connected to the chamber 13 and tank 11 for pumping the particulate material containing slurry to the settling tank 11, and a scraper unit 18 for removing the settled-out particulate material from the tank 11.

The frame 12 (FIGS. 1 and 2) is horizontally disposed below the settling tank 11 and includes an elevated portion 19 adapted to connect the apparatus 10 to a truck tractor unit (not shown). A set of rearwardly mounted transport wheels 21 are connected to the frame 12 to support the apparatus 10 above the ground 22 in both transporting and stationary positions. The frame 12 is further provided with adjustable stanchions 23 for supporting the apparatus 10 in a stationary position.

The settling tank 11 (FIGS. 2–4) is adapted to be filled with water for settling purposes, as is well known in the art, and generally includes a floor 24, a pair of side walls 26 and 27, an upright end wall 28, and a vertically inclined end wall 29. The end wall 29 extends upwardly and outwardly from the bottom 24, for purposes as hereinafter described. A baffle plate 31 is selectively spaced from end wall 28 and is connected to side walls 26 and 27, for purposes as hereinafter described.

A pair of forwardly extending mounting plates 32 and 33 (FIG. 1) are connected to side walls 26 and 27 and frame members 34 and 36 respectively. A chute 37 is pivotally connected to the plates 32 and 33, for purposes as hereinafter described.

The washing chamber 13 (FIGS. 3 and 4) generally includes a pair of elongated ducts 38 and 39 disposed laterally of side walls 26 and 27, respectively, and interconnected by intake chamber 41 disposed rearwardly of end wall 28. More specifically, the ducts 38 and 39 are defined by elongated panels 42 and 43 extended substantially parallel to walls 26 and 27, respectively, and connected thereto by top panels 44 and 46 and bottom panels 47 and 48, respectively. Bottom panels 47 and 48 are inclined toward walls 26 and 27 and rearwardly toward drains 49 and 51, as hereinafter described. Splash plates 52 and 53 are connected to the rearward ends of bottom panels 47 and 48 adjacent drains 49 and 51 to direct the slurry flow toward the drains 49 and 51. The forward ends 56 and 57 of the ducts 38 and 39 are fluidly connected to vertical stacks 59 and 61 for exhausting the washed gases to the atmosphere.

The intake chamber 41 (FIGS. 2 and 4) includes a curved back plate 62 disposed between and connected to the rearwardly extending ends 63 and 64 of elongated panels 42 and 43. The top of the intake chamber 41 is enclosed by top plate 66 connected to panels 42 and 43, back plate 62, and end wall 28 of the tank 11. An inlet 67 having an upright peripheral flange 68 is formed in the top plate 66 and is adapted to receive a particle-laden discharge from a plant (not shown) interconnected to the apparatus 10 by conduit 69 (FIG. 1). The lower portion of the curved back plate 62 (FIG. 2) extends forwardly to connect to splash plates 52 and 53.

The intake chamber 41 further includes an inverted V-shaped divider 71 (FIGS. 3 and 4) connected to a back plate 62 and end wall 28. The apex 72 of the divider 71 is disposed below the inlet 67 and generally bisects the inlet 67 in plan view. The divider 71 divides and directs the discharge toward the ducts 38 and 39.

The spray unit 14 (FIGS. 2–4) generally includes a feeder pipe 73 having a plurality of spray nozzles 74 connected thereto and disposed within the washing chamber 13 for washing the gaseous discharge with a pressurized water spray. The spray unit 14 further includes a plurality of vertical secondary pipes 76 having spray nozzles 77. The secondary pipes 76 are fluidly connected to the feeder pipe 73 and depend therefrom to provide a complete spraying action throughout the chamber 13.

The pressure pump 16 (FIGS. 1, 2 and 4) is mounted on platform 78 forwardly of stack 61 and includes a pivotal sump pipe 79 (FIGS. 4 and 5) fluidly communicating the pump 16 with the water within the tank 11. The sump pipe 79 is adapted to withdraw the clearer water located forwardly of the tank bottom 24 and is adapted to be raised or lowered by chain 81 to a position immediately below the water surface.

A pressure line 83 fluidly connects the pump 16 to the feeder pipe 73 of the spray unit 14. The pressure pipe 83 extends through side wall 27 and fluidly connects to cross-pipe 84 which pipe 84 extends through side walls 26 and 27 of the tank 11 to fluidly connect to the feeder pipe 73.

Thus it can be seen that the pump 16 withdraws clear water from the tank 11 and pumps the water to the spray unit 14 within the washing chamber 13. The particle-laden discharge circulating through the washing chamber 13 is thus subjected to the pressurized water spray to remove the particulate material therefrom which material falls to the bottom panels 47 and 48 of the chamber 13 in a slurry to flow toward the drains 49 and 51. The discharge, free of particulate material, is then exhausted to the atmosphere through stacks 59 and 61.

The sludge pump 17 (FIGS. 2 and 3) is mounted on a platform 86 connected to the frame 12 and is fluidly connected to drains 49 and 51 by a T-member (not shown) interconnecting the drains 49 and 51. A sludge pipe 87 is fluidly connected to the pump 17 and extends upwardly therefrom through intake chamber 41. The distal end 88 of the sludge pipe 87, relative to the pump 17, extends through end wall 28 adjacent to top plate 66 and directs the pumped slurry downwardly between the baffle plate 31 and end wall 28 toward the bottom 24 of the tank 11. The baffle plate 31 prevents a direct flow of the slurry into the settling tank and thereby inhibits a disturbance of the water within the tank 11 and thereby promotes the settling-out of the particulate material from the water.

To remove the settled-out particulate material from the tank 11, a scraper unit 18 (FIGS. 1, 2 and 5) is provided. The scraper unit 18 includes a pair of spaced apart endless chains 91 and 92 connected to a plurality of angled scrapers 93. The chains 91 and 92 are trained over a plurality of idler wheels 94, 95 and 96 and beneath idler wheels 97 and 98 connected to the tank 11, as is well known in the art. The scrapers 93 extend substantially the width of the bottom 24 of the tank 11 and are adapted to engage and pull the material collected thereon up the inclined end wall 29 to chute 37, which chute 37 directs the collected material away from the apparatus 10. The scraper unit 18 is powered by a motor 99 operatively connected to gear box 101 by belt 102. The gear box 101 is then connected by chain drive 103 to pulley 104 secured to idler member 96.

An improved wet washer and settling tank combination has thus been described that provides an integral unit, capable of being transported, that efficiently removes particulate material from gaseous discharges, and conserves water by providing a unique sump arrangement to recirculate clear water. The application of a baffle plate to reduce the disturbance of the water in the settling tank provides the apparatus with the capability of hastening settling-out of the particulate material therefrom and thereby increases its efficiency.

Although a preferred embodiment of the pollution control apparatus of this invention has been hereinbefore described, it is to be remembered that various modifications can be made thereto, without departing from the invention as hereinafter defined.

I claim:

1. A cleaner for removing particulate material from a stream of gas comprising:

an elongated wheeled frame, an interconnected gas washing chamber and settling tank juxtaposed on said frame, said settling tank being substantially an elongated rectangular chamber centered longitudinally along the length of said frame with an inlet end into which slurry is introduced and an opposite outlet end inclined upwardly and outwardly from the bottom thereof, said gas washing chamber being a duct substantially rectangular in cross section and arranged in plan view about said inlet end and the sides of said settling tank such that a relatively short inlet end portion of the duct is adjacent the inlet end of said settling tank and a pair of long side portions are adjacent respective sides of said settling tank, each of said side portions terminating in an outlet end adjacent a respective side of the outlet end of said settling tank, said short inlet end portion having an inlet for gas centrally located in the top thereof, the opposite outlet end of each of said long side portions having connected thereto an upright exhaust stack for exhausting gas introduced into said gas inlet, sprayer means within each of said long side portions of said washing chamber adapted to spray water throughout the interior thereof, pumping means connected to said sprayer means from a point near said outlet end within said settling tank slightly below the surface of the water contained therein to force water from said settling tank through said sprayer means to form slurry from particles present in the stream of gas within said gas washing chamber, an opening for drainage near said short inlet end portion in the bottom of each of said side portions of said gas washing chamber, the bottom of each of said side portions being inclined gradually downwardly toward the respective one of said openings for drainage, slurry pumping means having an intake connected to said openings for drainage and an outlet entering said settling tank near the top of said inlet end thereof, and an endless moving scraper means having a plurality of spaced scrapers disposed across the bottom of said settling tank to move slurry along the bottom of said settling tank toward and outwardly over said inclined outlet end thereof.

2. A cleaner as claimed in claim 1 having a baffle plate spaced a short distance from said inlet end of said settling tank across the upper and middle portions thereof, the slurry expelled from the outlet of said pumping means entering said settling tank in the space between said inlet end of said settling tank and said baffle plate.

3. A cleaner as claimed in claim 1 having a divider plate centered under said gas inlet to deflect approximately equal portions of a stream of gas entering said gas inlet into said pair of side portions of said duct, said divider plate being bent into a cross-sectional V-shape with the corner portion disposed upwardly below a longitudinal bisector of said gas inlet and a surface of each of the opposite end portions of the divider facing upwardly and outwardly toward an adjacent inlet end of a respective one of said side portions of said duct.

* * * * *